INVENTOR.
RAYMOND B. LARSEN

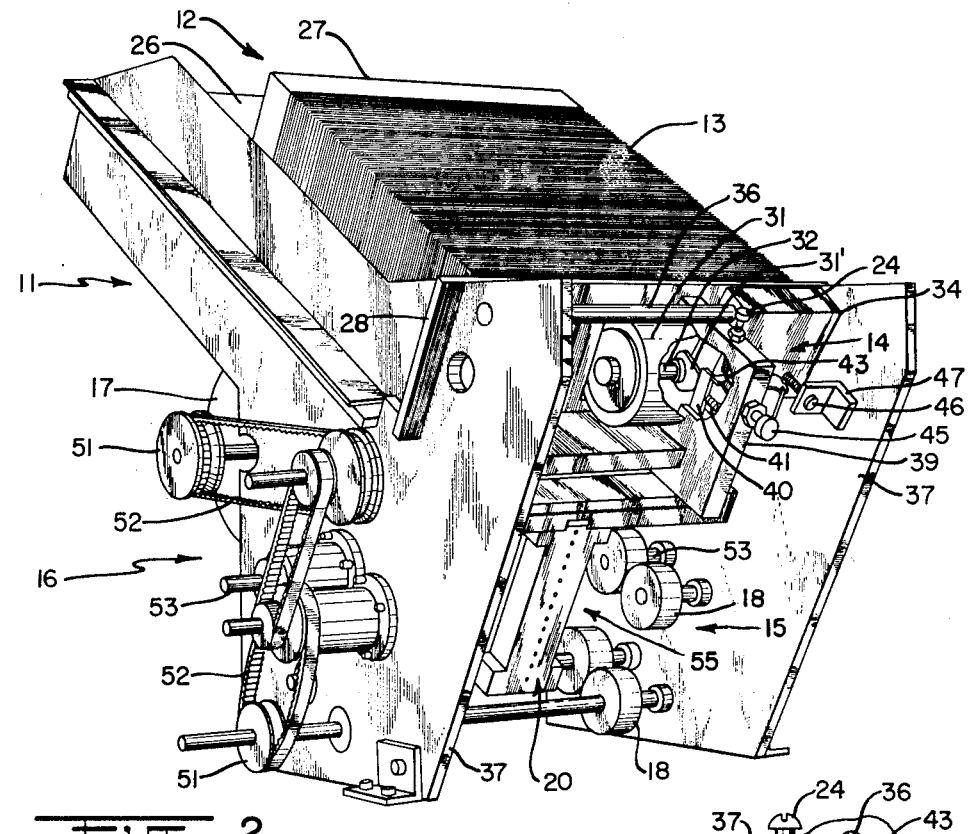
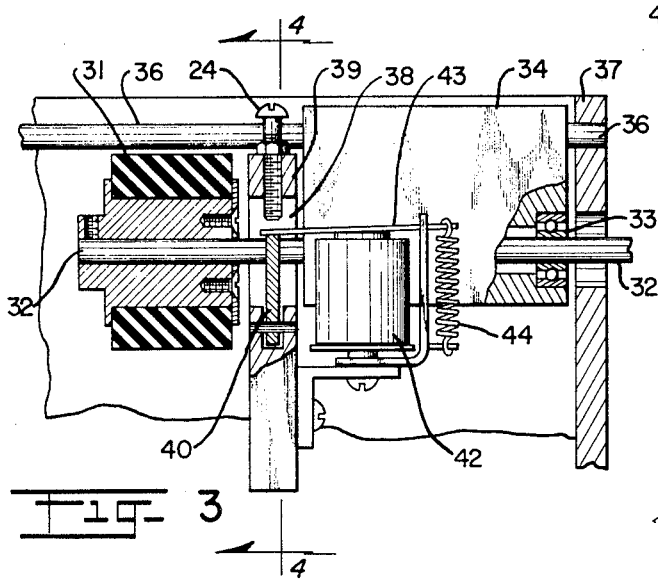
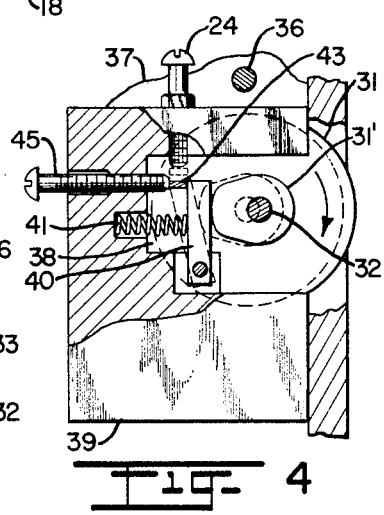
INVENTOR.
RAYMOND B. LARSEN
ATTORNEY

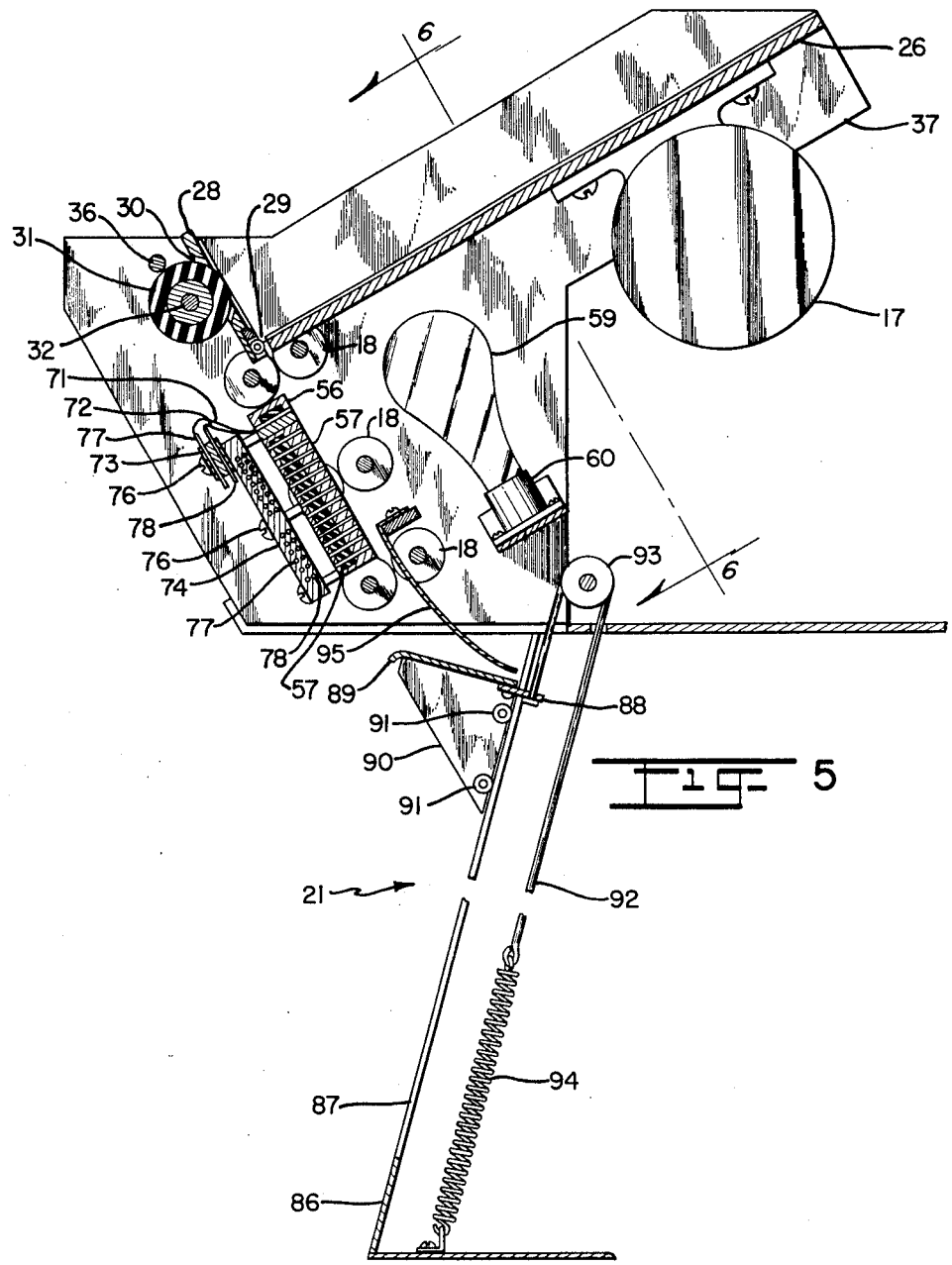

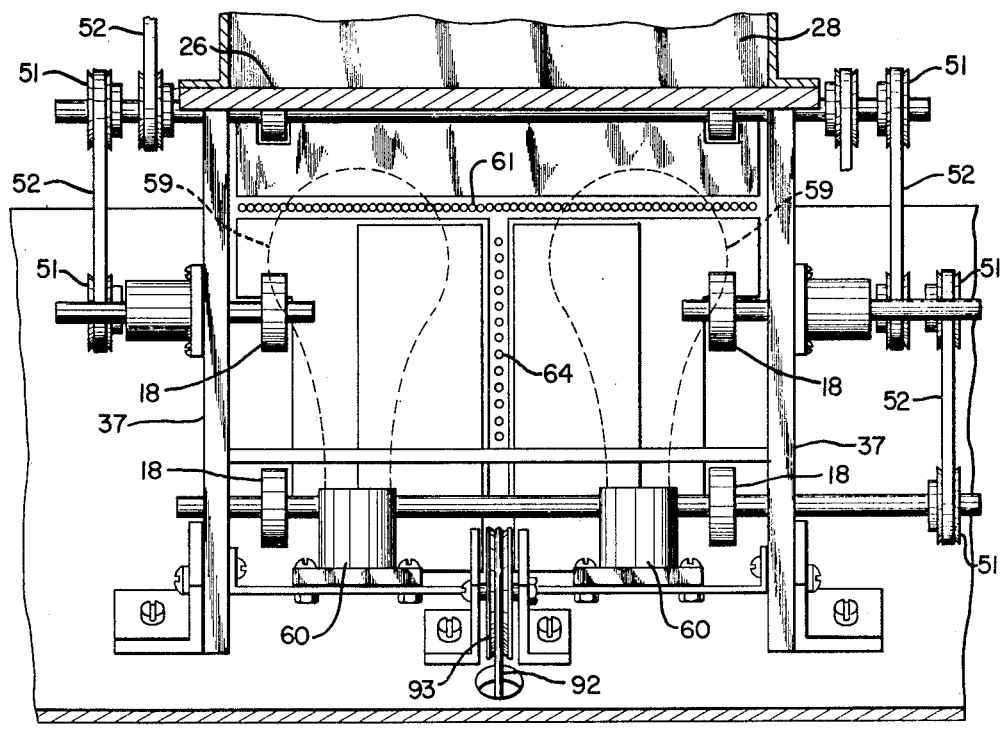
Fig. 6
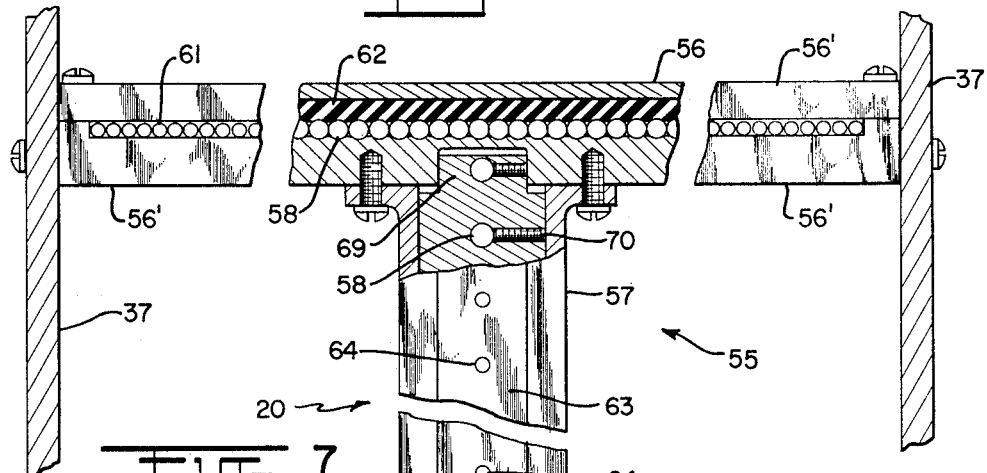
Fig. 7
INVENTOR.
RAYMOND B. LARSEN
BY
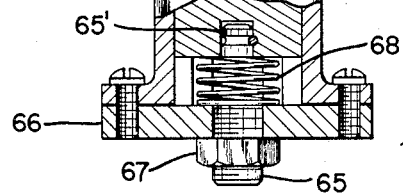
ATTORNEY July 28, 1964
R. B. LARSEN
3,142,749
READING MACHINE
Filed Oct. 20, 1958
5 Sheets-Sheet 5
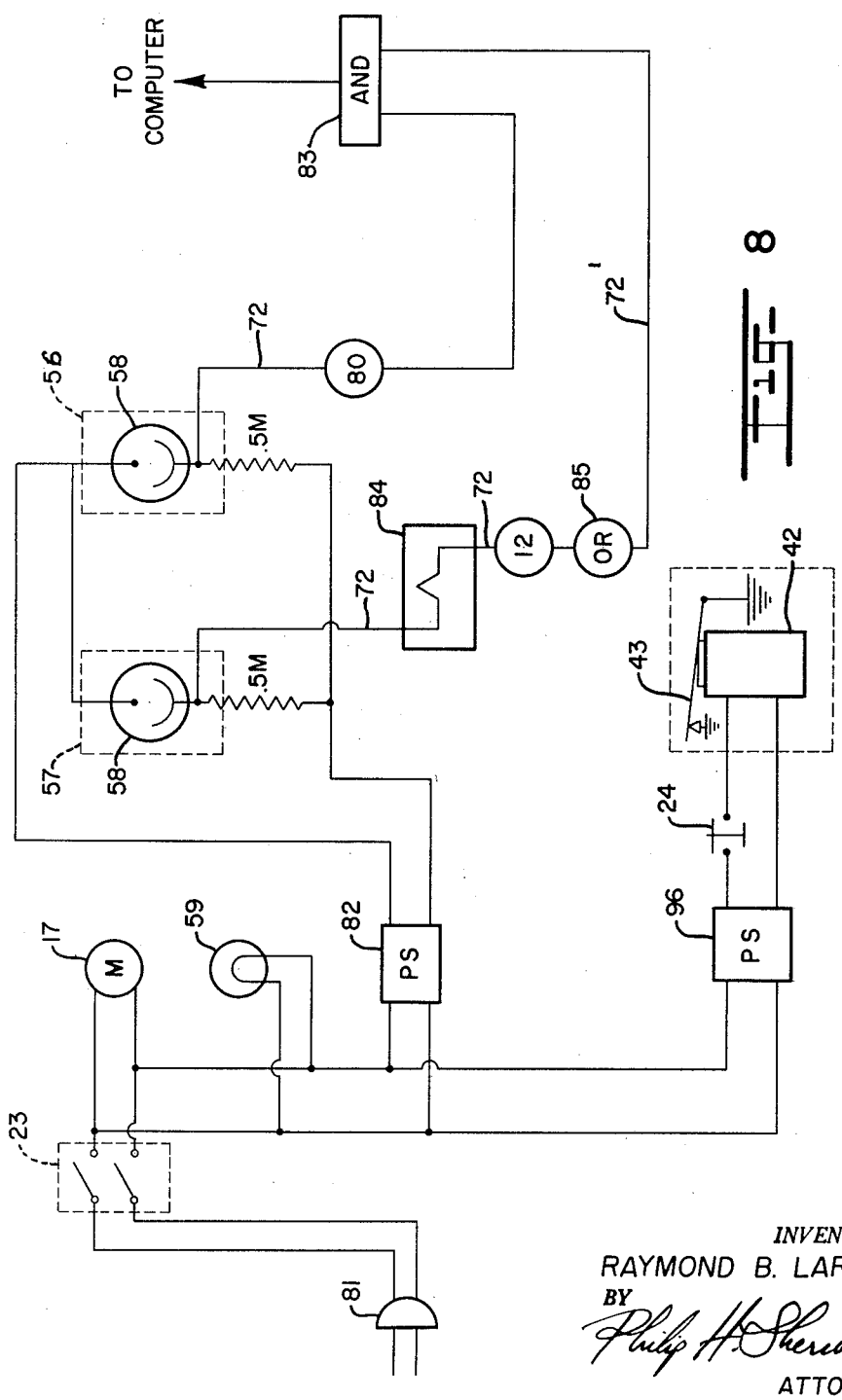
INVENTOR.
RAYMOND B. LARSEN
BY
Philip H. Sheridan
ATTORNEY 3,142,749
READING MACHINE
Raymond B. Larsen, Rawlins, Wyo., assignor to Uptime
Corporation, Rawlins, Wyo., a corporation of Wyoming
Filed Oct. 20, 1958, Ser. No. 768,332
11 Claims. (Cl. 235—61.11)

This invention relates to reading machines such as those employed in the analysis of tabulating cards and the like.

In the analysis and translation of information contained on tabulating cards, commonly termed punch cards, it is customary to provide light sensitive elements each arranged to scan a particular row or column of figures on the cards as they are moved between the elements and some light source. Each element is desirably disposed as close to the path of the cards as possible so as to be responsive only to the perforated positions in the column or row which is to be read thereby to more accurately translate the information to an associated mechanism, such as a tabulator or computer. It is also customary to provide in conjunction with the light sensitive reading elements some means to relate to the associated mechanism the column or row being read by the reading elements at a given instant. Of course, major considerations in the construction and design of reading machines are to increase their reading efficiency and speed since the speed and efficiency of associated data processing systems are obviously dependent upon the capabilities of the reading machine. In addition, the machine necessarily must be as compact as possible, due to the limited size of the cards and their rate of travel through the machine.

In accordance with the present invention both the card position sensing and reading operations are accomplished preferably by the light sensitive elements to eliminate the use of mechanical elements and in such a way that the operations may be physically separated to enable the unit to be made more compact, yet enable the operations to be performed simultaneously to thereby enable improved speed and accuracy in reading. The above is further made possible through the arrangement of a very compact position sensing and reading unit arranged in direct apposition to the guide path for the cards, thus further eliminating the necessity of mirrors or similar means to reflect the light energy back to the elements. Moreover, the compact arrangement of the timing and sensing element, along with providing for a novel improved card feeding system, enables the rapid and continuous lengthwise feeding and row-by-row sensing of the cards.

In addition, it is proposed to employ in conjunction with the timing and sensing elements a synchronized card feeding mechanism which is manually or automatically operable to selectively and positively feed cards through the reading machine at greatly increased rates of speed without danger of jamming. Also the angular disposition of the components together contributes to the over-all improvement of the machine so as to enable processing of cards at speeds more nearly compatible with that of computing and tabulating machines and thus increases the capabilities of the entire installation.

It is therefore a principal object of the present invention to provide a compact reading machine capable of rapidly and accurately timing and reading tabulating cards as they are fed continuously through the machine at high rates of speed.

It is another object to provide in a reading machine an improved light-sensitive means so constructed and arranged as to enable in an accurate and reliable manner the simultaneous position sensing and reading of each row of figures presented on tabulating cards, and in such a way that the cards may be read continuously at greatly increased rates of speed.

It is another object to provide an improved reading device for translation of information to an associated computer and the like in which provision is made for the rapid and simultaneous position indicating and reading of the information contained in the form of a number of rows of characters on a punch card without intercepting or physically contacting the cards.

It is a further object to provide, along a guide path arranged in a predetermined angular disposition for the travel of punch cards in closely spaced relation, light-sensitive means so constructed and arranged as to distinctly but simultaneously indicate the position of and read each of the rows of characters on the punch cards for translation to a computer and the like; and further wherein the guide path and light-sensitive means are so disposed in relation to the cards and to one another as to establish improved accuracy and reliability in analyzing the cards at high rates of speed.

It is still a further object to provide for the reliable and uniform feeding without jamming of a plurality of tabulating cards at high rates of speed for analysis by a reading unit.

It is an additional object to provide card picking means for reciprocal movement into and out of the entrance of a stack of tabulating cards so as to selectively and momentarily engage each of the cards and to enable synchronized movement of the cards in closely spaced relation along a restricted guide path without danger of jamming.

It is still an additional object to provide for the selective feeding in a reliable and uniform manner of a plurality of selectively perforated tabulating cards along a guide path, either continuously or intermittently, and in such a way that each card is momentarily engaged at a corresponding position for movement in predetermined spaced relation with the other cards through the guide path; also to establish therewith position sensing by a first series of light-sensitive elements arranged in spaced relation corresponding with the distance between rows on the tabulating cards, together with simultaneous reading by a second series of light-sensitive elements arranged in spaced relation along the guide path corresponding with the distance between columns on the tabulating cards and to thereby enable accurate and reliable reading at high rates of speed of the rows of information on the tabulating cards.

Other objects and advantages will become more apparent from the following description, taken together with the accompanying drawings, in which:

FIGURE 2 is a perspective view of the card input, card timing and reading sections, respectively, in accordance with the present invention;

FIGURE 3 is a fragmentary detailed view with parts broken away illustrating a portion of the card feeding assembly;

FIGURE 4 is a vertical section view taken on line 4—4 of FIGURE 3;

FIGURE 5 is a vertical cross section of the reading machine in accordance with the present invention;

FIGURE 6 is a view partially in section taken on line 6—6 of FIGURE 5;

FIGURE 7 is a detailed view illustrating the construction and arrangement of the light-sensitive elements in accordance with the present invention; and FIGURE 8 is a diagrammatic view showing the control circuit adapted for use with the reading machine of the present invention.

Figure 1:
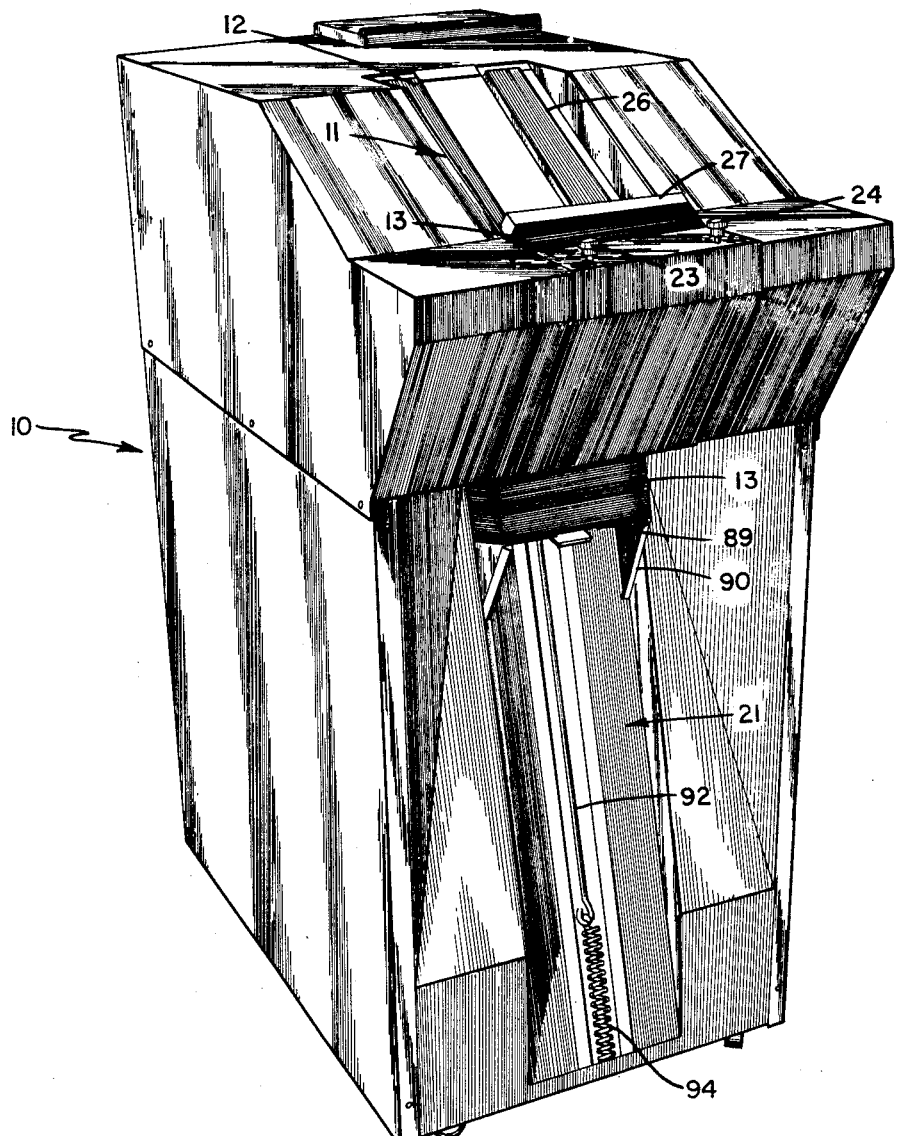
FIGURE 1 is a perspective view of a typical form of reading machine in accordance with the present invention.

Referring to the drawings, there is shown by way of illustration in FIGURES 1 and 2 a reading machine 10 including a housing enclosing the operating mechanism which is broadly comprised of a card input system 11 having a card magazine 12 for receiving a stack of cards 13, together with a card picker wheel assembly 14. A card advancing unit 15 is disposed to cooperate with the card input system and includes a drive assembly 16 operated off a drive motor 17 and pressure feed rolls 18 which serve to advance the cards along a guide path formed by the feed rolls as the cards are driven downwardly by the picker wheel assembly 14. A card timing and reading section 20 is located to intercept the cards for timing and reading and a card stacker 21 is shown located below the advancing unit 15 to receive the cards upon completion of the timing and receiving operation. To control the operation of the machine a starter button 23 and feed button 24 are indicated on the housing.

The card magazine 12 includes a tray 26 which is inclined forwardly and, for example, may be suitably disposed at a fifteen degree angle to the horizontal so as to tilt the cards 13 at a slightly forward angle, the cards being held in place in the magazine by means of a spring controlled plate 27 which urges the cards against a vertical end panel 28, as shown in FIGURE 5. The space adjacent to the end panel 28 within the tray forms an entrance into a guide slot 29 and the end panel 28 includes an opening 30 to accommodate a picker wheel 31 forming a part of the card picker wheel assembly 14, so as to permit engagement of the picker wheel 31 with each card in the tray as it advances against the end panel 28.

In order to selectively and positively feed each of the cards 13 through the guide slot 29, the picker wheel 31 is mounted both for rotation and reciprocation into and out of the opening 30 on a drive shaft 32 of the drive assembly 16. In turn the drive shaft 32 is journaled in bearings 33 on a block 34, the block 34 being free to pivot on a shaft 36 which is supported at its ends in a vertical frame 37. Shown in more detailed form in FIGURES 2-5, the reciprocal movement of the picker wheel 31 is controlled by means of a single lobe cam 31' mounted on the drive shaft 32, the cam being spaced within an opening 38 in vertical plate 39 which is attached to the end panel 28 of the card magazine 12. A pivotal detent 40 is carried by the plate 39 and is normally held in a vertical position by means of a spring 41 so that as the cam lobe is rotated on the drive shaft 32, it will engage the detent 40 each revolution and force the detent back against the spring 41, as shown dotted in FIGURE 4.

In order to initiate feeding of each card through the guide slot 29, the detent is made stationary so as to force the picker wheel 31 to pivot into the opening 30 each time the cam lobe strikes the detent 40. For this purpose a high speed relay armature 42 is mounted on one side of the plate 39, the armature including a lever arm 43 one end of which is normally biased in an upward position by means of a spring 44. However, when the machine is running but not feeding, energization of the relay armature by means of the feed button 24 will cause the arm 43 to be moved downwardly to extend between the detent 40 and an adjustable screw 45, the latter extending through the vertical plate 39. In this position, the detent 40 is held stationary and will force a rocking movement of the picker wheel 31 into the opening 30 each time the cam lobe rotates into and out of engagement therewith. In this connection, the extent of projection of the picker wheel 31 through the opening 30 to contact the cards 13 may be regulated by means of the adjusting screw 45 together with an adjusting screw 46, the latter being mounted in a bracket 47 extending from the frame 37 to engage the surface of the block 34 and to indirectly hold the drive shaft 32 in the desired position in relation to the opening.

The picker wheel 31 preferably consists of a rubber covered roll so as to insure proper frictional engagement with the face of the cards 13 for reliable positive feeding of each card through the guide slot 29. Of course the picker wheel moves through the opening 30 just long enough to engage each card and force it through the guide slot where it is immediately picked up by the feed rolls 18 of the advancing unit 15, after which the picker wheel 31 moves away from the opening and the next card is moved into the entrance so that the cards are moved through the slot in predetermined spaced relation without jamming the cards, which might otherwise occur through the continuous engagement of the picker wheel with the cards. This is extremely important where it is desirable to move the cards through at a high rate of speed, and it has been found possible to move the cards through the guide slot and along the guide path in the above manner at a rate in excess of 2000 cards a minute.

The card picker wheel assembly 14 together with the advancing unit 15 may be disposed vertically, but is preferably tilted rearwardly at right angles to the card magazine for reasons which will become more apparent in the description of the timing and sensing operation. The pressure feed rolls 18 for the advancing unit 15 are arranged in pairs with three pairs being shown spaced in generally vertical alignment to engage the leading end of each card as it moves through the guide slot 29 and along the guide path formed by the rolls 18. The rolls 18 are operated synchronously with the picker wheel 31 with the forward rolls being mounted on drive shafts extending through the vertical frame 37 at either side of the assembly for connection into the drive unit 16.

The drive unit 16 is comprised of conventional sprockets 51 driven by means of positive drive or "timing" belts 52 operated off of the motor 17. The motor 17 is shown mounted on the underside of the magazine 12 and in this connection a ¼ H.P., 1750 r.p.m. motor may be employed. The rearward, driven rolls are disposed on shafts 53 which are suitably journaled in the assembly frame 37 and each set of rolls 18 is so spaced as to provide continuous positive engagement with the cards as they are run along the guide path formed by the rolls, and therefore each of the sets of rolls will successively engage the leading edges of the cards just prior to the time that the card passes through the preceding set of rolls.

A conventional punch card is generally divided into a series of either 80 or 90 columns of figures or index point positions extending across the length of the card with 12 rows of figures extending vertically the width of the card in predetermined spaced relation. As described, the present invention enables positive feeding of the cards along the guide path so that each card in effect advances row by row vertically past the card timing and reading section 20, rather than column by column which has been customary practice in the past, on account of the close spacing between the figures, and great number of figures along each row. The figures or characters in each row are of course selectively perforated and in data processing systems it is desirable to translate this information to some associated mechanism such as a computer. In translating the information the computer, of course, must be told which row is being sensed and the positions or figures in each row which are perforated. To accomplish the above in a novel and unique way, a first and second series of light-sensitive elements are enclosed in a T-shaped support unit adjacent to and directly in front of the guide path. The T-bar unit is designated generally at 55 mounted between the vertical panels of the frame 37 with the rear face of the T-bar disposed just a trifle forwardly of the guide path formed by the feed rolls 18 as illustrated in FIGURE 5. The T-bar 55 is made up of a horizontally disposed oblong mounting block 56 bolted at its ends to the frame 37 and a vertical, I-shaped block 57 extending downwardly from the center of the block 56 so as to coincide with the center of the guide path. The unit 55 as a whole is arranged parallel to the guide path so that the cards are forced downwardly along the guide path in closely spaced parallel relation with the blocks 56 and 57, and due to the inclination of the guide path and T-bar unit 55 the cards will tend to curve toward the face of the T-bar unit and in this way aid in accurate alignment of the performated columns for reading.

The blocks 56 and 57 each form multiple unit holders for a series of light-sensitive elements 58, preferably in the form of photo-diodes. The elements 58 in the vertical mounting block 57 are so designed and arranged as to be responsive to the passage of the leading edge of each card between a light source 59 and each element to indicate at that instant the advancement of a corresponding row of figures between the light-sensitive elements in the horizontal block 56 and the light source. In turn the horizontal block contains an element corresponding to each index position in a column and is responsive to the passage of light through each perforated index point position in a column as each row is advanced between the light source 59 and the elements. Depending upon the number of columns on the punch cards 13 the horizontal mounting block 56 is therefore arranged to accommodate a corresponding number of photo-diodes. For example, for an 80 column card the block 56 is provided with 80 photo-diodes spaced across the mounting block so as to correspond with the spacing between columns. Accordingly, for a card eight inches in length it will be evident that the photo-diodes must be extremely compact and be arranged so that each diode will be responsive to light from a single column of figures only. The light source 59 itself consists of a pair of incandescent lights inserted in sockets 60 located and centered just behind the guide path.

To this end the photo-diodes are preferably of a type designed for rapid, high sensitivity reading and scanning and are extremely compact. For example, the Sylvania Type 1N77B photo-diode, described in the Sylvania Engineering Data Service Bulletin, dated August 13, 1957, may be suitably employed and includes a hermetically sealed envelope approximately 0.08 inch in diameter enclosing a lens portion at one end thereof with tinned leads extending from the opposite end. To accommodate the photo-diodes, the mounting block 56 is divided into upper and lower segments 56', the lower segment having a shallow groove on its upper surface formed to permit disposition of a row of 80 photo-diodes therealong in horizontal juxtaposed relation with the lens ends of the photo-diodes facing toward the guide path. For each photo-diode there is provided a pair of apertures 61, including an aperture extending inwardly from the front surface of the mounting block into the groove for disposition of the tinned leads and an aperture bored through the block from the rear face, adjacent to the guide path, into the side of the groove directly in front of the lens end of each diode. In addition, to hold each of the diodes yieldably but firmly in place in alignment with each of the respective apertures, a resilient strip 62 is interposed between the diodes and the upper segment. In the above manner the apertures extending in a row between the diodes and the guide path serve to direct and admit light into each of the respective diodes only when the index position or figure on the card passing over each aperture is perforated, and by projecting the lens end of each diode a slight distance into the inner end of each aperture the diode will be responsive only to the light passing through its corresponding aperture from the light source.

The vertical mounting block 57 is formed somewhat differently than the horizontal block 56 since the spacing between rows on the card is greater than the spacing between columns and also the disposition of the rows of figures with respect to the leading edge may vary in different groups and types of cards. Accordingly, the block 57 is desirably made vertically adjustable in relation to the mounting block 56 so as to conform to variations in row spacings which are encountered in different types of tabulating cards. For this purpose, the block 57 includes an adjustable plate 63 incorporating a plurality of vertically spaced apertures 64, similar in size to the apertures 61 in the block 56, to accommodate a number of photo-diodes 58, one for each row on the tabulating card. Adjusting means in the form of a bolt 65 is shown extending through a bottom plate 66 at the lower end of the block with a stem 65' projecting from its upper end into an opening in the bottom of the plate 63 and a threadable nut 67 on the lower end of the bolt to regulate the extension of the bolt through the bottom plate 66. Interconnecting the bolt 65 and plate 63 is a spring member 68 wrapped around the upper end of the bolt with the top strand of the spring interposed between stem 65' and the side of the opening in the plate to insure that the plate will follow the downward movement of the bolt as it is adjusted by the nut 67. The plate 63 also includes at its upper end a reduced extension 69 for movement into a channel in the under surface of the block 56, because in many instances the first row of figures is very close to the leading edge of the card and the uppermost diode in the plate 63 must of course sense the passing of the leading edge of the card at the same time that the first row of figures passes across the reading diodes.

Each of the photo-diodes 58 is held securely in position within the apertures by means of screws 70 extending through the side of the plate 61 for engaging the sides of the photo-diodes and holding them securely in position. In the above manner, the photo-diodes together with the plate 61 in the vertical block 57 may be adjusted so that as the leading edge of the card passes across each successive position sensing diode it will block the light from the light source to that diode to indicate the alignment of a corresponding row of figures for reading by the horizontally disposed photo-diodes.

The tinned leads of each diode constitute an anode lead 71 and cathode lead 72 for attachment to a set of terminal plates, there being a first terminal plate 73 for the reading diodes extending horizontally in spaced relation in front of the horizontal mounting block 57, and a vertically disposed terminal plate 74 for the position sensing diodes mounted in spaced relation in front of the block 57. The plates 73 and 74 are secured to the respective blocks 56 and 57 by means of bolts 76 and each of the plates include forward terminals 77 for each of the anode leads 71 and rear terminals 78 for each of the cathode leads 72 to permit convenient interconnection of the leads.

As shown schematically in FIGURE 8, an A.C. power source 81 supplies power to the motor 17, the lights 59 and a power source 82 which converts the power into D.C. voltage by means of a suitable network including a rectifier and voltage divider, not shown, to apply 50 volts through the terminals 77 across each of the diodes 58. In a well known manner, negative bias is supplied to each of the diodes so that an increased voltage across the diodes is necessary for firing, this voltage being produced of course by the light energy from the light source 59. Upon firing of each diode, a circuit is then completed from the power source through the diodes 58 through the cathode leads, as represented by the single connection line 72 in FIGURE 8, into a corresponding number of AND gates, as represented at 83.

Each of the respective AND gates 83 will, of course, deliver an output signal into the computer only in response to two or more input signals. Accordingly, each of the position sensing diodes 58 mounted in the block designated at 57 in FIGURE 8 is connected preferably through a circuit to supply an input signal to each of the respective AND gates 83 to indicate the passage of a corresponding row of selectively perforated positions on a card across the horizontal reading diodes. Since, in the preferred form as described, the light source will normally traverse the vertical diodes in the absence of the passage of the cards thereacross, to normally energize the diodes an input signal is supplied to the AND gates only in response to the de-energization of each position sensing diode. De-energization is of course caused when the cards pass across the face of the vertical block 57 to successively block the passage of light to the diodes disposed therein. Accordingly, and in a well known manner, differentiated circuits represented at 84 are connected to each cathode lead 72, each circuit 84 more specifically constituting a conventional cathode-coupled binary circuit which will generate a positive pulse when activated on a negative-going voltage, the negative voltage in this case being supplied at the moment each diode is de-energized. Moreover, to prevent accidental triggering of each of the binary circuits, which might otherwise be caused by the passage of a perforated figure across the diodes followed by passage of the trailing end of the card, delaying means may be incorporated into the binary circuit so that a positive pulse will not again be generated in the circuit until the positive voltage builds up for a predetermined length of time corresponding with the time which elapses between the passage of each of the cards across the diodes.

From the above it will be apparent that each of a succession of pulses may be supplied as input signals into each of the AND gates and when the AND gate simultaneously receives an input signal from its respective reading diode to indicate the passage of a perforated position thereacross the gate 83 will relate an output signal to the computer for recording. In this connection it is desirable to eliminate the connection of each cathode lead from the vertical diodes into each of the gates 83 and for this purpose the individual leads 72 from the vertical diodes may be connected into an OR gate 85 whereupon the gate 85 will deliver a succession of output signals through a single line 72' as an input signal or pulse is delivered to the OR gate through each of the lines 72.

In order to automatically stack the cards as they pass from the lower feed rolls 18, a conventional card stacker 21 is mounted directly below the feed rolls and as will be noted from FIGURE 5 is tilted forwardly beneath the lower end of the guide path. The card stacker 21 comprises an elongated metal plate 86 mounted in the housing of the reading machine having a centrally located vertical slot 87 through which there is extended a flange 88 for supporting a platform 89 to receive each of the cards. The platform 89 is arranged for slidable up and down movement along with the vertical plate 86 by means of brackets 90 spaced at either end of the platform 89, the brackets 90 having rollers 91 attached thereto to engage the surface of the plate 86. Downward movement of the platform 89 is controlled by means of a cable 92, which is drawn over a pulley 93 on the housing platform, the pulley being secured at its opposite end to an elongated spring 94 secured by a suitable bracket to the floor of the housing. In this manner, the platform 89 will move downwardly against the force of the spirng 94 by the increasing weight of cards as they stack up successively on the platform 89. In addition, a leaf spring 95 is secured to the frame so as to damp out any card flutter which may occur due to the speed of movement of the cards as they leave the guide path and are stacked onto the platform.

The operation of the reading machine is initiated by depression of the starter button 23 to apply power from the A.C. power source 81 respectively to the motor 17, the lights 59, the D.C. power source 82 and a power source 96 into the control circuit for the relay armature 42. The motor 17 operates the drive unit 16 to start the picker wheel 31 in motion. As hereinbefore described, however, card feeding is separately initiated through depression of the feed button 24 which closes the circuit into the relay coil so as to energize the relay armature 42 to force the wheel 31 to pivot into the card stack through the opening 30. Also, manual or automatic card feeding is made possible either by selective depression of the feed button which is spring controlled, or by locking it in a closed position to close the circuit into the relay coil for the armature 42. Again, cooperative engagement and release by the picker wheel permits selective synchronized timing of the feeding of each card with the reading operation and minimizes and substantially eliminates the possibility of jamming, while controlling the advancement of the cards to pass along the guide path in the desired spaced relation.

As each card is sent through the guide slot 29 it is immediately picked up by the advancing rolls, the rolls 18 as described being arranged to positively urge the cards along the guide path from the moment they leave the magazine 12 until they are laid in the stacker 21. Each of the vertical diodes beginning with the one nearest the reading diodes will instantaneously sense the disposition of a row of figures in alignment with the reading diodes for translation of an input signal to each of the AND gates 83 and coupled with an input signal from the reading diodes each AND gate will generate an output signal into the computer or similar system.

Through the application of the present invention, reliable and accurate sensing of cards on the order of 4000 cards a minute has been found possible. In this connection the separation between position sensing and reading makes possible the more compact arrangement of the horizontal diodes in a position adjacent to the card path. Furthermore, the relationship between the row sensing diodes and the reading diodes eliminates the need for mechanical synchronization so as to permit much more rapid and at the same time simultaneous position sensing and reading. In addition, since mechanical synchronization elements are eliminated thereby enabling the horizontal diodes to be disposed next to the card path, accurate response to the light passing through the perforated index positions is assured without necessity of more complex systems.

While the form of apparatus herein described constitutes a preferred embodiment of the present invention, it will be understood that the invention is not limited to this exact form and that changes may be made therein without departing from the scope of the present invention as described in the appended claims. For example, feed button 24 may be manually or automatically energized.

What is claimed is:

1. A reading device adapted to analyze tabulating cards bearing characters arranged in a series of rows and columns, comprising: a generally vertically disposed guide path, means associated with said guide path to advance each of the cards along said guide path; and an electrical circuit including a light source, a first series of light-sensitive elements arranged in spaced relation corresponding with the distance between rows on the cards each being individually responsive to the passage of a card thereacross to generate a separate signal, a second series of light-sensitive elements arranged in horizontal spaced relation corresponding with the distance between columns on the cards to read each row and generate signal means corresponding thereto; and means supporting said first series and second series of elements in correlated relation to provide for simultaneously sensing the position of and reading, respectively each row of characters on the cards.

2. A reading device adapted to analyze tabulating cards wherein each card includes selectively perforated positions arranged in a series of rows and columns, comprising a card holder, means defining a rearwardly inclined guide path to successively advance the cards therealong, means including a picker mounted for reciprocation with respect to said card holder to selectively initiate the movement of each of the cards edgewise along the guide path, a light source, a holder enclosing a first series of light-sensitive elements each element arranged in vertical spaced relation corresponding with the distance between rows on the cards to generate a separate signal in response to the advancement of a card thereacross, and a second series of light-sensitive elements arranged in horizontal spaced relation corresponding with the distance between columns on the cards to read each row and to generate signal means corresponding thereto, said holder being supported to extend adjacent to said guide path in parallel relation thereto, each of said first series of elements being correlated with said second series of elements to generate simultaneous signals indicative of the position of and reading, respectively, of each row of positions on the cards, and means associated with said first and second series of elements to relate a signal only in response to the receipt of simultaneous signals from each of said first series of elements and said second series of elements.

3. A reading device adapted to analyze tabulating cards bearing selectively perforated positions arranged in a series of rows and columns, comprising a forwardly inclined card magazine, means defining a rearwardly inclined guide path extending downwardly at right angles to said card magazine and including a picker wheel mounted for rotation and reciprocation into and out of frictional engagement with the end card in said card magazine, and a plurality of vertically spaced rollers for synchronously advancing each of said cards along said guide path, a light source, a T-shaped member extending parallel to said guide path defining a horizontal holder centered at said light source enclosing a row of juxtaposed reading elements and including a light receiving aperture for each element and a vertically adjustable holder enclosing a column of vertically spaced position sensing elements including a light receiving aperture for each element, and each of said position sensing elements being operative to independently sense the position of each card simultaneously with the reading of each row of positions on the cards as they are successively advanced along the guide path.

4. A reader adapted to analyze tabulating cards selectively perforated in columns and rows of index point positions, comprising a light source, a first series of light-sensitive elements, a second series of light-sensitive elements, and means for advancing each card in succession along a path of travel between said light source and said first and second series of elements, said first series having an element for each row of index point positions with each successive element in said first series being responsive independently of one another to the passage of the leading edge of each card between said light source and said element to generate a separate signal to indicate the advancement of each corresponding row of index point positions between said second series of elements and said light source, said second series of elements having an element for each index point position in a column responsive to the passage of light through each perforated index point position in a column as each row is advanced between said light source and said second series of elements to generate signal means corresponding to the number of perforations in a row, and means associated with said first and second series of elements being energized only in response to receipt of simultaneous signals from said second series and each of said first series of elements.

5. A reader adapted to analyze tabulating cards selectively perforated in columns and rows of index point positions, comprising a light source, a first series of phototube elements, a second series of phototube elements, means for advancing each card in succession continuously along a vertically inclined path of travel between said light source and said first and second series of elements, and means for supporting said first and second series adjacent to the path of travel of said cards, said light source normally traversing said first and second series of elements, said first series having an element corresponding with each row of index point positions with each successive element being independently responsive to the passage of the leading edge of each card between said light source and said element to indicate the advancement of each corresponding row of index point positions between said second series of elements and said light source, and said second series of elements having an element for each index point position in a column responsive to the passage of light through each perforated index point position in a column as each row is advanced between said light source and said second series of elements.

6. A reader adapted to analyze tabulating cards selectively perforated in columns and rows of index point positions, comprising a light source, a horizontally disposed holder enclosing a row of light-sensitive elements centered at said light source, a vertically disposed holder extending downwardly from said horizontally disposed holder and enclosing a second series of light-sensitive elements, said holders being provided with a plurality of apertures, each aperture being disposed to admit light from said light source to a light-sensitive element, and means for advancing each card in rapid succession along a path of travel between said light source and said first and second series of elements, said first series having an element for each row of index point positions on a card with each successive element in said first series being independently responsive to the passage of the leading edge of each card between said light source and said element to indicate the advancement of a corresponding row of index point positions between said second series of elements and said light source, and said second series of elements having an element for each index point position in a column responsive to the passage of light through each perforated index point position in a column as each row is advanced between said light source and said second series of elements.

7. A reader adapted to analyze tabulating cards selectively perforated in columns and rows of index point positions, comprising a light source, a generally T-shaped card reading unit centered upon said light source and disposed at a rearwardly inclined angle to the vertical, said unit constituting a horizontal holder enclosing a row of juxtaposed photo-diode reading elements and a vertical holder enclosing a column of vertically spaced photo-diode position sensing elements, each of said holders including a first series of apertures, one for each photo-diode to admit light from said light source into each photo-diode, and a second series of apertures to permit connection of each photo-diode into an electrical circuit, a plurality of rollers defining a guide path for successively advancing said cards row by row across the face of said card reading unit between said first series of apertures and said light source, said position sensing elements and related apertures corresponding in number and spacing to the number and spacing of rows on said cards, each successive position sensing element being de-energized by the passage of the leading edge of a card thereacross, to indicate the alignment of each successive row on a card with said reading elements, said reading elements and related apertures corresponding in number and spacing with the number and spacing of columns on said cards, each reading element being energized as a perforated position in each column passes thereacross, and means connected to said position sensing elements and said reading elements being responsive to the simultaneous de-energization of each successive position and element and energization of said reading elements to relate a signal to an associated recording mechanism to indicate the perforated positions in each corresponding row on said cards.

8. A reader according to claim 7 in which said vertical holder is vertically adjustable for varying the distance of said position sensing elements from said reading elements in accordance with the distance of each row on a card from the leading edge thereof.

9. A reader according to claim 7 in which said means is characterized by AND gates connected to each of said reading elements and a differentiated circuit interposed between each of said position sensing elements and each of said AND gates to deliver an input signal to said AND gates as each successive position sensing diode is de-energized when the leading end of each card passes thereacross.

10. In a reading device adapted to analyze tabulating cards bearing characters arranged in a series of rows and columns, the combination with means defining a guide path for advancement of each of the tabulating cards therealong and a series of light sensitive reading elements disposed across the path of advancement to read each row of characters on the cards and to transmit signal means corresponding thereto, of a plurality of light sensitive row sensing elements arranged in spaced relation to one another along the guide path corresponding with the distance between rows on the cards and being further disposed in predetermined relation to the reading elements each row sensing element being operative to signal the passage of a respective row across the reading elements independently of the other row sensing elements at rates up to about 4000 cards per minute, and means associated with each row sensing element to correlate the signal therefrom with the reading of each respective row.

11. In a reading device adapted to analyze tabulating cards bearing characters arranged in a series of rows and columns, the combination with means forming a guide path to advance the tabulating cards in predetermined relation therealong and a light source, together with a series of light-sensitive reading elements arranged in spaced relation across the guide path corresponding with the distance between columns on the card for reading each row in succession thereon, of a series of light sensitive row sensing elements arranged in predetermined spaced relation to the light-sensitive reading elements and to one another whereupon each row sensing element is operative in succession and independently of one another to signal the passage of each row across the light sensitive reading elements, and means associated with the light sensitive reading elements and said row sensing elements being energized only in response to the receipt of simultaneous signals from the light sensitive reading elements and each of said row sensing elements.

References Cited in the file of this patent

UNITED STATES PATENTS

| | | |
|---|---|---|
| 458,945 | Crane et al. | Sept. 1, 1891 |
| 2,757,866 | Johnson | Aug. 7, 1956 |
| 2,831,634 | Luhn | Apr. 22, 1958 |
| 2,848,535 | Hunt | Aug. 19, 1958 |
| 2,853,237 | Zaffarano et al. | Sept. 23, 1958 |
| 2,880,999 | Oldenboom | Apr. 7, 1959 |